(12) United States Patent
Ratnakar

(10) Patent No.: US 8,848,892 B2
(45) Date of Patent: Sep. 30, 2014

(54) CONTACT LIST WITH CONVERSATION POINT REMINDER

(76) Inventor: Nitesh Ratnakar, Elkins, WV (US)

( * ) Notice: Subject to any disclaimer, the term of this patent is extended or adjusted under 35 U.S.C. 154(b) by 1448 days.

(21) Appl. No.: 12/049,326

(22) Filed: Mar. 15, 2008

(65) Prior Publication Data

US 2008/0205621 A1    Aug. 28, 2008

(51) Int. Cl.
- *H04M 1/64* (2006.01)
- *H04M 11/00* (2006.01)
- *H04M 3/42* (2006.01)
- *H04M 1/725* (2006.01)
- *H04M 1/2745* (2006.01)
- *G06Q 10/10* (2012.01)

(52) U.S. Cl.
  CPC ........ *H04M 1/2745* (2013.01); *H04M 1/72552* (2013.01); *H04M 2250/68* (2013.01); *G06Q 10/107* (2013.01)
  USPC ................ 379/201.01; 379/88.11; 379/93.23; 379/201.04

(58) Field of Classification Search
  USPC ........ 379/218.01, 93.17, 93.18, 93.19, 93.24, 379/93.25, 93.26, 93.27, 110.01, 354, 379/355.01, 355.02, 355.03, 355.04, 379/355.05, 355.06, 355.07, 356.01, 379/357.03, 357.04, 357.05, 373.01, 379/373.02, 373.03, 373.04, 374.01, 374.02
  See application file for complete search history.

(56) References Cited

U.S. PATENT DOCUMENTS

| | | | |
|---|---|---|---|
| 6,442,251 B1 * | 8/2002 | Maes et al. ................. | 379/93.23 |
| 2004/0119761 A1 * | 6/2004 | Grossman et al. ............ | 345/854 |
| 2006/0195445 A1 * | 8/2006 | Julia et al. ......................... | 707/6 |
| 2006/0245555 A1 * | 11/2006 | Makela ...................... | 379/88.12 |
| 2008/0057927 A1 * | 3/2008 | Han .............................. | 455/415 |

* cited by examiner

*Primary Examiner* — Khai N Nguyen
(74) *Attorney, Agent, or Firm* — Jundong Ma

(57) ABSTRACT

The present invention relates to contact list with means to attach memo to contact list entry. Memo comprises of one or more of data, voice, image, and video files. Memo is displayed on communication device when corresponding contact list entry is activated, such as when contact list entry is selected to initiate outgoing communication; and when incoming communication is received from entity corresponding to contact list entry. Present invention provides users means to remember desired conversation points at the time communication is initiated with an entity.

10 Claims, 4 Drawing Sheets

| Name | Address | Phone | Fax | Email | URL | Memo |
|---|---|---|---|---|---|---|
| | | | | | | |
| | | | | | | |
| | | | | | | |
| | | | | | | |

| Name | Address | Phone | Fax | Email | URL | Memo |
|------|---------|-------|-----|-------|-----|------|
|      |         |       |     |       |     |      |
|      |         |       |     |       |     |      |
|      |         |       |     |       |     |      |
|      |         |       |     |       |     |      |

Fig. 1

CONTACT LIST WITH CONVERSATION POINT REMINDER

BACKGROUND AND PRIOR ART

Contact list is a common feature in most modern communication devices. It comprises of multiple contact list entries and enables users to enter and save contact information of entities. Users are able to enter and save name, address, phone, fax, and email into a contact list entry. Most communication devices also provide users means to speed dial a phone number container in contact list entry directly without having to dial phone number manually. It also a common knowledge that users sometimes forget important conversation points during telephonic conversation with an entity whose contact information is saved in communication device. Hence there remains a need for a contact list with means to enable user enter memo into contact list entry and remind user of said memo when communication is initiated with corresponding entity.

SUMMARY

The present invention relates to contact list with means to attach memo to contact list entry. Memo comprises of one or more of data, voice, image, and video files. Memo is displayed on communication device when corresponding contact list entry is activated, such as when contact list entry is selected to initiate outgoing communication; and when incoming communication is received from entity corresponding to contact list entry. Present invention provides users means to remember desired conversation points when communication is initiated with an entity.

BRIEF DESCRIPTION OF DRAWINGS

FIG. 1 shows the database structure of contact list of present invention.

DETAIL DESCRIPTION OF DRAWINGS

Figure 2:
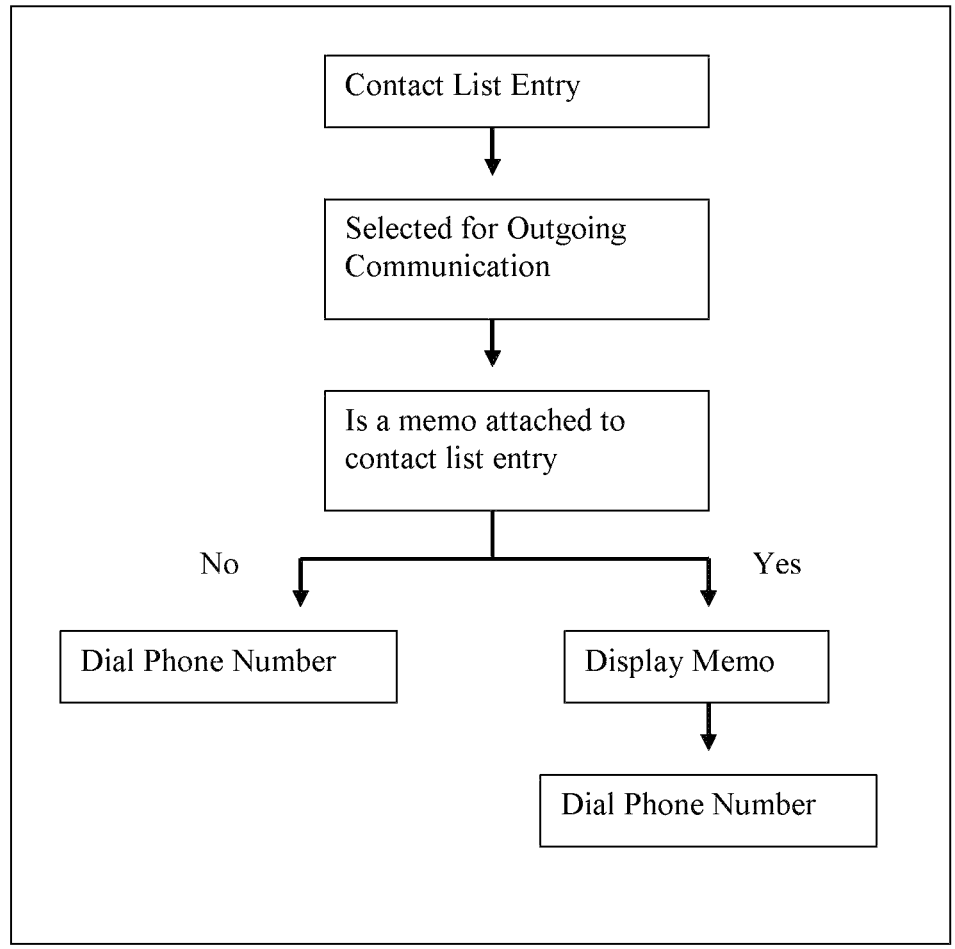
FIG. 2 shows the method of display of memo in contact list entry of communication device when contact list entry is selected for outgoing communication.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out one or several purposes of the present invention. It is important, therefore, that the claims be regarded as including such equivalent constructions insofar as they do not depart from the spirit and scope of the present invention.

Figure 1:
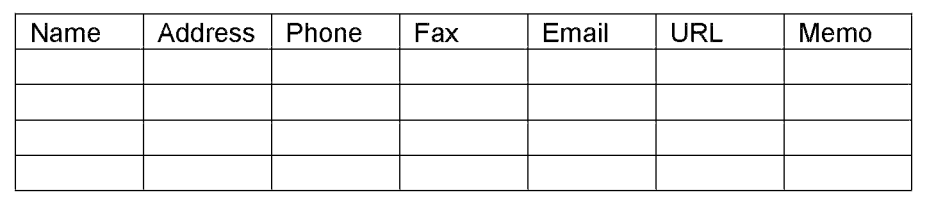
Figure 3:
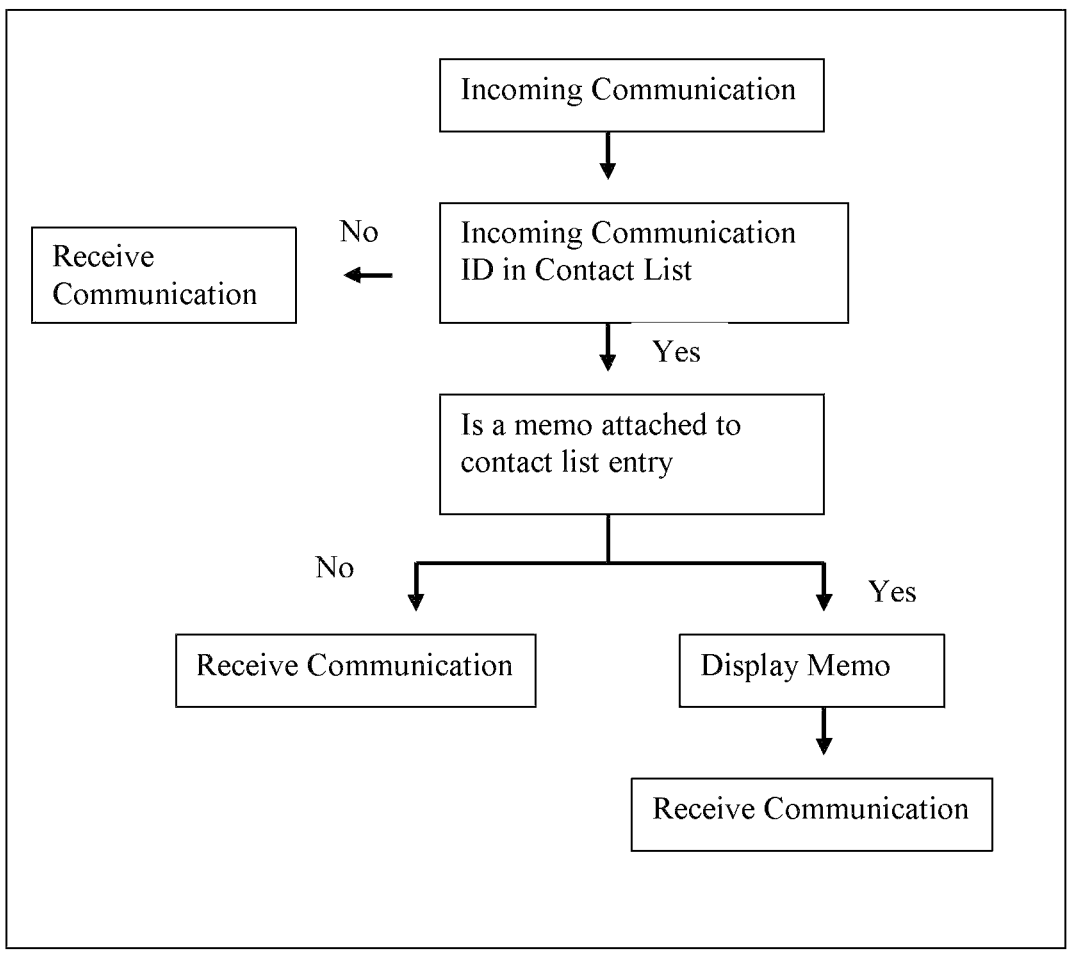
FIG. 3 shows the method of display of memo in contact list entry of communication device when incoming communication is received from entity corresponding to contact list entry.

Contact list for communication device is provided and comprises of multiple contact list entries. FIG. 1 shows contact list template for communication device. Each contact list entry comprises of data fields to input contact information details. Preferably data fields include entity name, address, phone, fax, email, and web site URL. Additionally, data field is provided in contact list entry to input memo pertaining to corresponding contact information. Data field for memo can be integrated within contact list entry; alternatively data field for memo can be in a separate database and memo and corresponding contact list entry can be related by means of link for co-functionality. Memo can be one or data, voice, image or video files. Means is provided in communication device to save information contained in contact list. As shown in FIG. 2, means is provided in communication device to display memo recorded with contact list entry when corresponding contact information is activated by user. Contact list entry may be activated, for example, when user opens contact information contained therein for viewing. Alternatively, contact list entry is activated when phone number contained therein is dialed using speed dial feature. Means is also provided to activate contact list entry when communication device detects incoming phone call from entity corresponding to contact list entry as shown in FIG. 3. Means is provided in communication device to display data and image memo; and replay audio and video memo when corresponding contact list entry is activated. Display of memo upon activation of corresponding contact list entry serves as reminder to user about desired topic of conversation. Preferably, memo is also displayed at the end of phone call with corresponding entity; at which time user is provided option to erase, save or edit memo. Display of memo serves as reminder of desired conversation points when communication is initiated with corresponding entity. This enables users to remember important conversation points during communication with entity.

Figure 4:
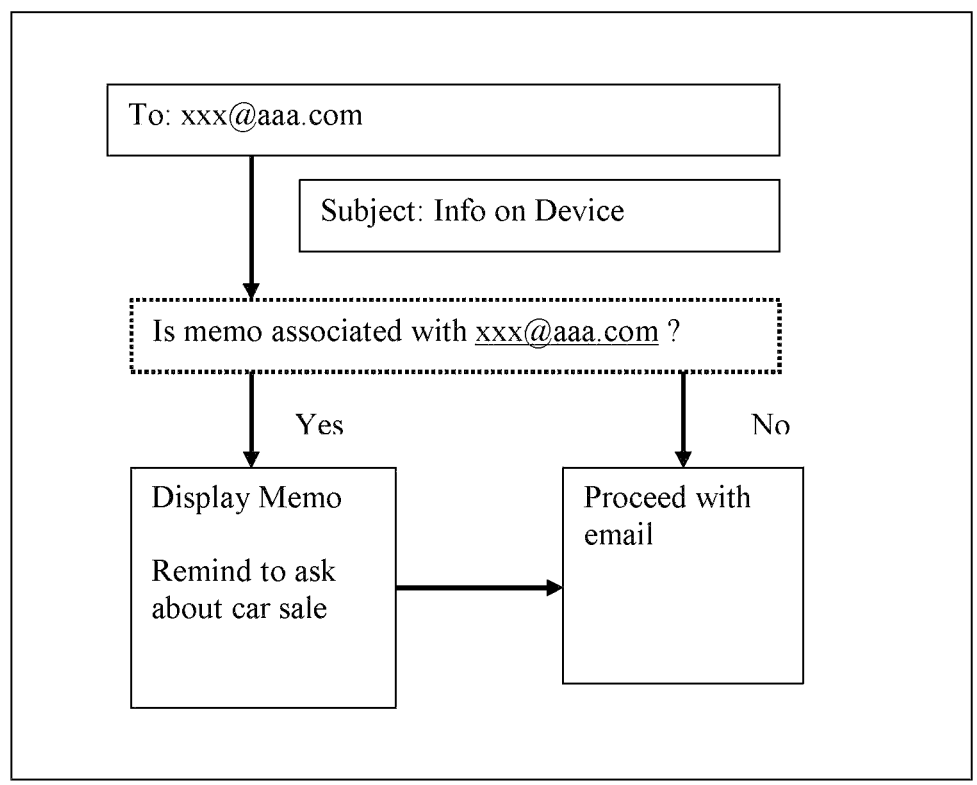
FIG. 4 shows display of memo attached to contact list entry in email contact list when contact list entry is selected for outgoing communication.

According to another aspect of the invention, means is provided to record memo into other types of contact lists; such as contact list provided with email clients such as hotmail, outlook, gmail etc. Memo can be one or more of data, audio, image and video file. As shown in FIG. 4, when contact list entry is selected by user to send an email, corresponding memo is displayed on the display monitor as reminder to the user. Preferably, means is also provided to display memo when incoming email from entity corresponding to contact list entry is received. Additionally means is provided to display memo when user responds to email received from entity in contact list. Memo reminds user of important conversation points while reviewing email relating to corresponding entity.

Additionally time sensitive functionality is provided to memo attached to contact list and email. According to one aspect, means is provided to remind user of memo attached to contact list entry at selected times. For example, user can attach a memo to entity contact information in contact list of communication device regarding time sensitive task. Said memo is displayed at the time corresponding contact information is activated; and in addition memo is also displayed at selected times reminding user of said time sensitive task.

I claim:

1. A method, performed by a communication device, for reminding a user of the communication device of a conversation point for a future phone call, the communication device having a processor and a display screen, the communication device having access to a saved contact list having one or more contact list entries, each contact list entry of the contact list including a first field configured to retrieve a stored phone number of a corresponding entity of the respective contact list entry, a second field configured to retrieve a stored name identifying the corresponding entity, and a memo field configured to attach memo data inputted by the user and displayable to show at least one memo which is served to remind the user of the conversation point for the future phone call between the user and the corresponding entity, the method comprising:

(a) receiving, by the processor, a first input indicating that an incoming phone call from the stored phone number of a first contact list entry of the saved contact list is received;

(b) checking, by the processor after step (a), whether there is memo data that is attached to the memo field of the first contact list entry;

(c) activating, by the processor, the first contact list entry such that during the activating of the first contact list entry, the user accepts the incoming phone call and conducts the incoming phone call with the corresponding entity of the first contact list entry using the communication device as a result of the user's accepting the incoming phone call; and (d) causing, by the processor, a first indication indicating a presence of the at least one memo of the attached memo data, to be automatically displayed on the display screen during the activating of the first contact list entry, when it is detected in the step (b), by the processor, that there is memo data attached to the memo field of the first contact list entry.

2. The method of claim 1, wherein the first indication comprises content of the at least one memo of the memo data.

3. The method of claim 1, the memo data attached to the memo field of the first contact list entry comprises at least one of text, audio, image and video that is displayable or otherwise playable to show the at least one memo of the memo data.

4. The method of claim 1, wherein the step (b) of checking of whether there is memo data that is attached to the memo field of the first contact list entry is performed before or during the step (c) of activating the first contact list entry.

5. The method of claim 4, the user is provided by the communication device at least one option to erase, save or edit memo data attached to the memo field of the first contact list entry at the end of the incoming phone call.

6. A method, performed by a communication device, for reminding a user of the communication device of a conversation point to be mentioned in a future phone call, the communication device having a processor and a display screen, the communication device having access to a saved contact list having one or more contact list entries, each contact list entry of the contact list including a first field configured to retrieve a stored phone number of a corresponding entity of the respective contact list entry, a second field configured to retrieve a stored name identifying the corresponding entity, and a memo field configured to attach memo data inputted by the user and displayable to show at least one memo which is served to remind the user of the conversation point to be mentioned during the future phone call between the user and the corresponding entity, the method comprising:

(a) receiving, by the processor, a first input indicating a request that the stored phone number of a first contact list entry of the saved contact list be dialed for an outgoing phone call;

(b) checking, by the processor after step (a), whether there is memo data that is attached to the memo field of the first contact list entry;

(c) activating, by the processor, the first contact list entry such that during the activating of the first contact list entry, the stored phone number of the first contact list entry is dialed for the outgoing phone call and the user conducts the outgoing phone call with the corresponding entity of the first contact list entry using the communication device as a result of the outgoing phone call being received and accepted by the corresponding entity of the first contact list entry; and (d) causing, by the processor, a first indication indicating a presence of the at least one memo of the attached memo data, to be automatically displayed on the display screen during the activating of the first contact list entry, when it is detected in the step (b), by the processor, that there is memo data attached to the memo field of the first contact list entry.

7. The method of claim 6, wherein the first indication comprises content of the at least one memo of the memo data.

8. The method of claim 6, the memo data attached to the memo field of the first contact list entry comprises at least one of text, audio, image and video that is displayable or otherwise playable to show the at least one memo of the memo data.

9. The method of claim 6, wherein the step (b) of checking of whether there is memo data that is attached to the memo field of the first contact list entry is performed before or during the step (c) of activating the first contact list entry.

10. The method of claim 6, the user is provided by the communication device at least one option to erase, save or edit memo data attached to the memo field of the first contact list entry at the end of the outgoing phone call.

* * * * *